(12) United States Patent
De Oliveira Filho et al.

(10) Patent No.: US 8,784,678 B2
(45) Date of Patent: Jul. 22, 2014

(54) REVERSE IRON ORE FLOTATION BY COLLECTORS IN AQUEOUS NANOEMULSION

(75) Inventors: Antonio Pedro De Oliveira Filho, San Paulo (BR); Wendel Johnson Rodrigues, Sao Paulo (BR)

(73) Assignee: Clariant S.A., Sao Paulo (BR)

( * ) Notice: Subject to any disclaimer, the term of this patent is extended or adjusted under 35 U.S.C. 154(b) by 1034 days.

(21) Appl. No.: 12/669,715

(22) PCT Filed: Jul. 18, 2008

(86) PCT No.: PCT/EP2008/005893
§ 371 (c)(1),
(2), (4) Date: Jan. 19, 2010

(87) PCT Pub. No.: WO2009/077015
PCT Pub. Date: Jun. 25, 2009

(65) Prior Publication Data
US 2010/0213105 A1 Aug. 26, 2010

(30) Foreign Application Priority Data

Jul. 20, 2007 (EP) .................................. 07014309

(51) Int. Cl.
*B03D 1/01* (2006.01)
*B03D 1/008* (2006.01)
*B03D 1/02* (2006.01)

(52) U.S. Cl.
CPC *B03D 1/01* (2013.01); *B03D 1/008* (2013.01); *B03D 1/02* (2013.01); *B03D 2203/04* (2013.01)
USPC ........................................... 252/61; 209/166

(58) Field of Classification Search
CPC ............ B03D 1/01; B03D 1/008; B03D 1/02; B03D 2203/04
USPC ........................................... 252/61; 209/166
See application file for complete search history.

(56) References Cited

U.S. PATENT DOCUMENTS

| | | | |
|---|---|---|---|
| 2,014,406 A | 9/1935 | Weed et al. | |
| 2,259,420 A | 10/1941 | Hills | |
| 2,649,415 A * | 8/1953 | Sundberg et al. | ............. 507/248 |
| 3,363,758 A | 1/1968 | Cronberg et al. | |
| 3,418,254 A * | 12/1968 | Bishof et al. | .................. 252/392 |
| 4,168,227 A | 9/1979 | Polgaire et al. | |
| 4,319,987 A | 3/1982 | Shaw et al. | |
| 4,422,928 A | 12/1983 | McGlothlin et al. | |
| 4,454,047 A | 6/1984 | Becker et al. | |
| 4,556,545 A | 12/1985 | Cheruvu | |
| 4,594,151 A | 6/1986 | Delourme et al. | |
| 4,732,667 A | 3/1988 | Hellsten et al. | |
| 4,789,466 A * | 12/1988 | von Rybinski et al. | ....... 209/166 |
| 4,830,739 A | 5/1989 | Hellsten et al. | |
| 4,929,343 A | 5/1990 | Wang et al. | |
| 4,995,965 A | 2/1991 | Mehaffey et al. | |
| 5,261,539 A | 11/1993 | Hancock et al. | |
| 5,540,336 A | 7/1996 | Schreck et al. | |
| 5,540,337 A | 7/1996 | Riggs et al. | |
| 5,720,873 A | 2/1998 | Klingberg et al. | |
| 6,039,936 A * | 3/2000 | Restle et al. | .................. 424/70.1 |
| 6,076,682 A | 6/2000 | Gustafsson et al. | |
| 6,464,990 B2 * | 10/2002 | Simonnet et al. | ............. 424/401 |
| 6,541,018 B1 * | 4/2003 | Simonnet et al. | ............. 424/401 |
| 7,476,393 B2 * | 1/2009 | Dubief et al. | ................. 424/401 |
| 2004/0151746 A1 * | 8/2004 | Dubief et al. | ................. 424/401 |

FOREIGN PATENT DOCUMENTS

| | | |
|---|---|---|
| CA | 1 100 239 | 4/1981 |
| EP | 0 311 759 | 4/1989 |
| EP | 0 609 257 | 4/1993 |
| FR | 993 892 | 11/1951 |
| FR | 1 096 459 | 6/1955 |
| GB | 578 694 | 7/1946 |
| GB | 2 167 470 | 5/1986 |
| SU | 1 143 469 | 3/1985 |
| WO | WO 93/06935 | 4/1993 |
| WO | WO 00/62937 | 10/2000 |
| WO | WO 02/48294 | 6/2002 |

OTHER PUBLICATIONS

International Search Report for PCT/EP2008/005893 dated Oct. 30, 2008.
International Preliminary Report on Patentability for PCT/EP2008/005893 dated Nov. 5, 2009.
Kostansek, Edward, "Emulsions", Kirk Othmer Encyclopedia of Chemical Technology, vol. 10, pp. 113-133, Jul. 18, 2003.
English abstract for FR 1 096 459, Jun. 21, 1955.
English abstract for SU 1 143 469, Mar. 7, 1985.

* cited by examiner

*Primary Examiner* — Thomas M Lithgow
(74) *Attorney, Agent, or Firm* — Tod A. Waldrop

(57) ABSTRACT

The present invention relates to a process for concentration of silicate-containing minerals and ores by froth flotation, in particular to a reverse flotation process, in the presence of a finely dispersed collecting agent characterized by a specific droplet size distribution.

7 Claims, 2 Drawing Sheets

REVERSE IRON ORE FLOTATION BY COLLECTORS IN AQUEOUS NANOEMULSION

FIELD OF THE INVENTION

This invention relates to the application of nanoemulsions of collectors for the silicate flotation and in the reverse concentration of iron ore. A preferred embodiment of this invention is the use of ethermonoamines, etherdiamines, hydrocarbon amines, sternamines, ammonium compounds and/or mixtures thereof, in form of a nanoemulsion, for reverse flotation of iron ore. The use of the collectors in form of nanoemulsion provides an improved selectivity of the separation of silica from the iron ore.

BACKGROUND OF THE INVENTION

Reverse flotation is a common process applied in the art separating the gangue from the valuable minerals via the froth. Particularly silicate-containing ores like iron ore, calcium carbonate, phosphates and feldspar are concentrated by this process by enriching and removing the silicate impurities, i.e. quartz, mica and feldspar but also muscovite and biotite, in the flotate.

Iron ore commonly contains silicates which have a negative impact on the quality of the iron produced thereof and complicate the production process of high quality steels. Therefore oxidic iron ores, i.e. magnetite, haematite, matte, limonite and goethite, are concentrated by reverse silicate flotation by using alkylether amines and alkylether diamines as typical collectors for silicate minerals.

Fatty amines, alkylether amines, alkylether diamines and quaternary ammonium compounds are known as collectors for silicate containing minerals and are commercialized e.g. under the trade name Flotigam®.

Reverse iron ore flotation is described in U.S. Pat. No. 3,363,758, U.S. Pat. No. 4,168,227, U.S. Pat. No. 4,422,928 and U.S. Pat. No. 4,319,987, in which the use of alkyletheramines, alkyletherdiamines, primary amines and mixtures thereof is disclosed. Due to their poor water solubility the application of partially neutralized ammonium acetates is also disclosed.

CA-1 100 239 discloses the use of alkylether monoamines or diamines in combination with an emulsifying agent in a froth flotation process.

U.S. Pat. No. 5,540,337 discloses a process of separating at least one mineral, e.g. silica, from an aqueous medium, which may contain iron ore, by froth flotation using cationic alkyloxyalkaneamine collectors free of acrylonitrile.

U.S. Pat. No. 4,732,667 and U.S. Pat. No. 4,830,739 disclose a process and composition for the beneficiation of iron minerals from iron ores containing silicate and phosphate minerals, comprising as collector a combination of a primary amine and a nitrogen compound containing an anionic group selected from methylene carboxylic acid, ethylene phosphoric acid and methylene phosphonic acid.

The use of anionic surfactants as co-collectors is also disclosed in U.S. Pat. No. 5,540,336 and EP-A-0 609 257 in combination with at least one alkylether amine or one alkylether diamine. The selective removal of phosphorous impurities without any negative impact on the cationic flotation of the silicate is disclosed.

U.S. Pat. No. 6,076,682 describes a froth flotation process of silica from iron ore by using a collecting agent which contains a combination of an alkylether monoamine with alkylether diamine.

WO-A-00/62937 describes the use of quaternary ammonium compounds in a froth flotation process of silicate from iron ore.

The removal of silicate containing impurities from calcite using methyl-bis(2-hydroxypropyl)-cocosammonium methyl sulfate as flotation reagent is described in U.S. Pat. No. 4,995,965.

U.S. Pat. No. 5,261,539 suggests the application of alkoxylated alkylguanidines and alkoxylated amines in the reverse flotation of calcite.

U.S. Pat. No. 5,720,873 discloses the combination of quaternary ammonium salts with an alkylene oxide adduct of fatty amines for cleaning calcium carbonate ore from silicates. A significant improvement is disclosed in respect of the separation of acid insoluble matter.

The aim of the present invention is to develop a more selective and efficient froth flotation process for the beneficiation and ore concentration of silicate containing minerals and ores. The present invention relates in particular to the reverse flotation process of iron ore and calcite, which results in a high recovery of the valuable mineral as well as in low silica content, but also to the direct flotation of quartz and other silicates.

It has surprisingly been found that the selectivity and efficiency of the froth flotation process can be significantly improved by using a finely dispersed collector agent characterized by a specific droplet size distribution in the nanometer scale.

The state of the art is silent on the preferred droplet size of collectors used during the process of flotation. The flotation process is based on interactions between interfaces of solid, liquid and gas phases. Therefore the size of micelles formed by the collector has a determining significance for the efficiency and selectivity of the concentration during flotation process. Droplet size analysis of ether monoamines and diamines has shown that these standard collectors, which regularly applied in partially neutralized form, are forming micelles in water with an average droplet larger than 30 μm, mostly larger than 250 μm. The simple combination of those ether amines with an emulsifying agent as disclosed by CA-1 100 239 yield unstable, quickly coalesced emulsions whose droplet size can not by determined (see Table 2).

Alkylether monoamines and diamines can be finely dispersed in conjunction with nonionic, anionic or cationic surfactants by using a mechanical high-pressure-homogenizer of the Gaullin type at pressures up to 1500 bar to give stable emulsions showing a droplet size in the range of 1 nm to 20 μm. To achieve the very small droplet size required herein, the emulsion of the collector has to be passed at least one time through the high-pressure homogenizer. If necessary, the passing through the high pressure homogenizer has to be repeated until such particle size is reached. Surprisingly it was found that these collector emulsions of nanometer scale exhibit advantageous properties regarding selectivity and iron recovery in the reverse iron ore flotation which distinguishes them from conventional products. Thus, we have observed that the general metallurgical performance of a collector, i.e. selectivity and recovery, relates directly to its size of micelle in the emulsion.

This invention therefore relates to a nanoemulsion, comprising at least one collector for the flotation of silicate minerals from other minerals, at least one emulsifier, and water, wherein water forms the continuous phase and the average particle size of the collector which forms the discontinuous phase is from 1 nm to 20 μm.

The invention further relates to a process for the production of a nanoemulsion, comprising at least one collector for the flotation of silicate minerals from other minerals, at least one emulsifier, and water, wherein water forms the continuous phase and the average particle size of the collector which forms the discontinuous phase is from 1 nm to 20 μm, the process comprising the step of passing a mixture of the collector, the emulsifier and water through a mechanical high pressure homogenizer at a pressure from 100 to 1500 bar.

The invention further relates to a process for beneficiation of ores from silicate gangue, the process comprising the steps of bringing the ore into contact with the above-described nanoemulsion and frothing of the so obtained composition.

The nanoemulsion of the invention comprises at least one collector, preferably in the amount of 20 to 60 wt.-%, in particular in the amount of 25 to 50 wt.-%, particularly preferred in the amount of 30 to 40 wt.-%.

The amount of emulsifier in the nanoemulsion is preferably at most 20 wt.-%, particularly at most 10 wt.-%, more preferably at most 5 wt.-%. A preferred lower limit for the amount of emulsifier is 0.1 wt.-%, more preferably 1 wt.-%.

The nanoemulsion preferably contains up to 79.9 wt.-% water, more preferably 20 to 79 wt.-% water, most preferably 30 to 60 wt.-% water.

Figure 1:
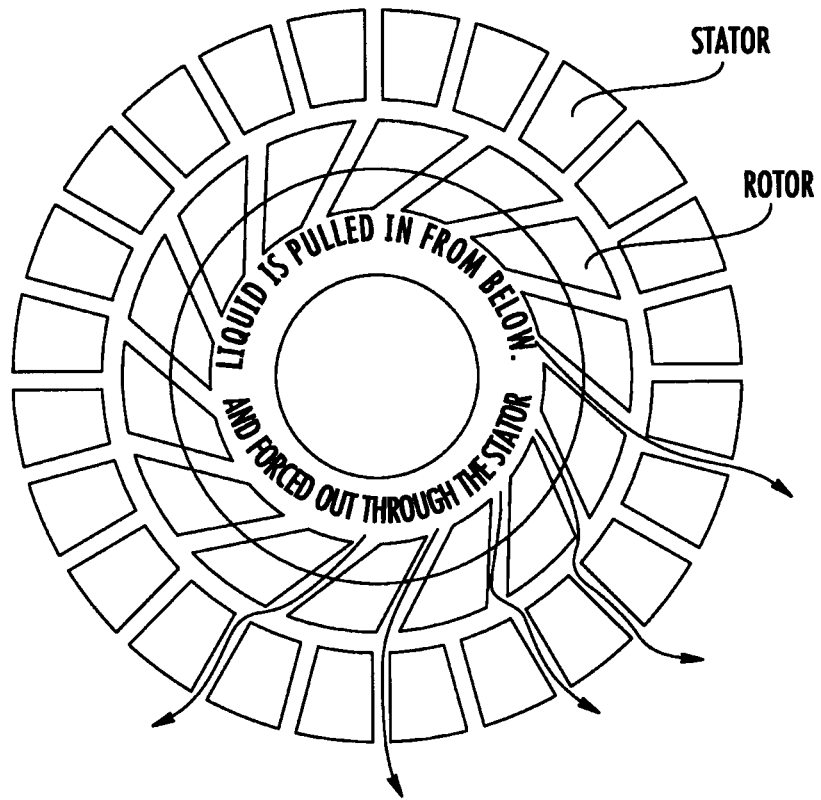
FIG. 1 is a schematic representation of a Ultra turrax used to pre-homogenize or homogenize the emulsions.

In a preferred embodiment of the invention, the collector is a compound comprising at least one nitrogen atom and further comprising at least one hydrocarbon group having 6 to 30 carbon atoms. More preferably, the collector is selected from ether monoamines, ether diamines, stern-amines, hydrocarbon amines and/or quaternary ammonium compounds.

Preferred ether monoamines correspond to formula 1

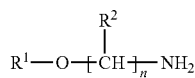 (1)

wherein
R$^1$ is a linear or branched, saturated or unsaturated C$_6$-C$_{30}$ hydrocarbon group, such as an alkyl, alkenyl, or alkynyl group,
R$^2$ is selected from H, CH$_3$, CH$_2$CH$_3$ or (CH$_2$)$_2$CH$_3$,
n is 1, 2, 3, 4 or 5.

Preferred etherdiamines correspond to formula 2

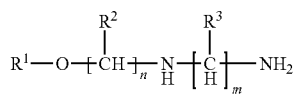 (2)

wherein
R$^1$ is a linear or branched, saturated or unsaturated C$_6$-C$_{30}$ hydrocarbon group, such as an alkyl, alkenyl, or alkynyl group,
R$^2$ and R$^3$ are independently from each other selected from H, CH$_3$, CH$_2$CH$_3$ or (CH$_2$)$_2$CH$_3$,
n, m are independently from each other 1, 2, 3, 4 or 5.

Preferred stern-amines correspond to formula 3

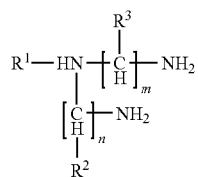 (3)

wherein
R$^1$ is a linear or branched, saturated or unsaturated C$_6$-C$_{30}$ hydrocarbon group, such as an alkyl, alkenyl, or alkynyl group,
R$^2$ and R$^3$ are independently from each other selected from H, CH$_3$, CH$_2$CH$_3$ or (CH$_2$)$_2$CH$_3$,
n, m are 1, 2, 3, 4 or 5.

Preferred hydrocarbon amines correspond to the formula 4

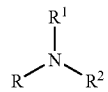 (4)

wherein
R is a linear or branched, saturated or unsaturated C$_6$-C$_{30}$ hydrocarbon group, such as an alkyl, alkenyl, or alkynyl group,
R$^1$ and R$^2$ are independently from each other selected from H, CH$_3$, linear or branched, saturated or unsaturated C$_2$-C$_{22}$ hydrocarbon groups, such as alkyl, alkenyl or alkynyl groups.

Preferred quaternary ammonium compounds correspond to formula 5

$$[R^1R^2R^3R^4N]^+X^-$$ (5)

wherein R$^1$, R$^2$, R$^3$, and R$^4$ independently from each other are linear, branched, cyclic or any combination thereof, saturated or unsaturated hydrocarbon groups, and X is an anion. The sum of the number of carbon atoms in R$^1$, R$^2$, R$^3$, and R$^4$ ranges from 6 to 30. R$^1$, R$^2$, R$^3$, and R$^4$ may be alkyl, alkenyl, alkynyl, cycloalkyl, aryl, or any combination of any of the foregoing. X may be chloride, carbonate, bicarbonate, nitrate, bromide, acetate, carboxylates, sulphate or methosulphate.

A preferred quaternary ammonium compound corresponds to formula 6

$$[R^1(CH_3)_3N]^+X^-$$ (6)

wherein R$^1$ is a linear or branched, saturated or unsaturated C$_6$-C$_{30}$ hydrocarbon group, such as alkyl, alkenyl, or alkynyl group and X is defined as above. More preferably, R$^1$ is a linear C$_6$-C$_{18}$ saturated or unsaturated group and X is chloride, carbonate, acetate or sulphate.

Another preferred quaternary ammonium compound corresponds to formula 7

$$[R^1R^2(CH_3)_2N]^+X^-$$ (7)

wherein R$^1$ is a linear or branched C$_6$-C$_{30}$ saturated or unsaturated aliphatic hydrocarbon group or a C$_6$-C$_{30}$ substituted or unsubstituted aryl group, R$^2$ is a linear or branched C$_1$-C$_{30}$ saturated or unsaturated aliphatic hydrocarbon group or C$_6$-C$_{30}$ substituted or unsubstituted aryl group, and X is defined as above. Substituted means substitution with C$_1$-C$_{20}$ alkyl.

Preferably, $R^1$ and $R^2$ independently are linear or branched $C_8$-$C_{16}$ saturated or unsaturated hydrocarbon groups. In a more preferred embodiment, $R^1$ and $R^2$ independently are linear or branched $C_8$-$C_{12}$ saturated or unsaturated hydrocarbon groups and X is chloride, carbonate, or acetate.

Another preferred quaternary ammonium compound corresponds to formula 8

$$[R^1R^2(CH_3)_2N]^+X^- \qquad (8)$$

wherein $R^1$ is a substituted or unsubstituted benzyl group, $R^2$ is a linear $C_{10}$ to $C_{20}$ saturated or unsaturated hydrocarbon group, and X is defined as above. According to a preferred embodiment, $R^1$ is benzyl, $R^2$ is a linear $C_{12}$-$C_{18}$ saturated or unsaturated hydrocarbon group, and X is chloride.

Another preferred quaternary ammonium compound corresponds to formula 9

$$[R^1R^2N(CH_3)(CH_2CH_2O)_kH]^+X^- \qquad (9)$$

wherein $R^1$ is a $C_6$-$C_{30}$ linear or branched alkyl group or a $C_6$-$C_{30}$ substituted or unsubstituted aryl group, $R^2$ is a $C_1$-$C_{30}$ linear or branched alkyl group or a $C_6$-$C_{30}$ substituted or unsubstituted aryl group, k is an integer from 1 to 5, and X is defined as above. Preferably, $R^1$ and $R^2$ are linear or branched $C_8$-$C_{10}$ groups and more preferably are decyl. X is preferably chloride.

Another preferred quaternary ammonium compound corresponds to formula 10

$$[R^1R^2R^3(CH_3)N]^+X^- \qquad (10)$$

wherein $R^1$, $R^2$, and $R^3$ independently are linear or branched $C_6$-$C_{22}$ saturated or unsaturated hydrocarbon groups. More preferably $R^1$, $R^2$, and $R^3$ independently are linear or branched $C_8$-$C_{10}$ saturated or unsaturated hydrocarbon groups. X is preferably chloride.

The term hydrocarbon as used herein denotes, unless specified otherwise, an alkyl, alkenyl, alkynyl, cycloalkyl or aryl group, all of which may be linear or branched (if applicable) and may carry substituents. Hydrocarbon groups may contain heteroatoms (e.g. O, N, S, P) if such heteroatoms do not change the predominantly hydrocarbon character. The term substituted denotes, unless specified otherwise, a substitution with one or more $C_1$- to $C_{20}$ alkyl groups.

These ethermonoamines, etherdiamines, sternamines, amines and quaternary ammonium compounds defined above can be used individually or as mixture thereof and will by formulated with a specific emulsifier agent prior to use.

Preferred emulsifiers are alkoxylated fatty alcohols corresponding to formulae 11a or 11b

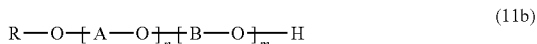

wherein n is a number from 1 to 30 and m is a number from 1 to 30, n and m being independently from each other preferably from 2 to 10, A and B are independently from each other $C_2$- to $C_4$-alkylene groups and R is a saturated or unsaturated, branched or linear $C_6$ to $C_{30}$ aliphatic or aromatic hydrocarbon group, preferably a $C_6$ to $C_{20}$ alkyl, alkylaryl or alkenyl group. Formula 11a denotes a polyoxyalkylene homopolymer or a polyoxyalkylene random copolymer. Formula 11b denotes a polyoxyalkylene block copolymer.

Preferred emulsifiers are also alkylbetaines of formula 12

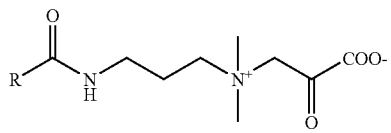

wherein R is a linear or branched $C_6$-$C_{24}$ saturated or unsaturated aliphatic hydrocarbon group, preferably a $C_{11}$-$C_{17}$ alkyl group.

A pour point depressant was used to give more stability and fluidity to the emulsion. Suitable pour point depressants are aliphatic alcohols such as methanol, ethanol, n-propanol, isopropanol, n-butanol, isobutanol, methylisobutyl carbinol and 2-ethyl hexanol but are not limited thereon. Preferably, also polyalkylene glycols, preferably polyethylene glycols, can be used as pour point depressants.

The average particle size of the collector, which forms the discontinuous phase in water as the continuous phase, is from 1 nm to 20 μm, preferably from 3 nm to 6 μm, particularly preferred from 30 nm to 900 nm.

The average particle size is determined by using a light-scattering particle size analyzer, e.g. the MALVERN MASTER SIZE 2000. To measure the droplets size distribution, 1-1.5 mL of emulsion was introduced in the measure compartment that contain about 1000 mL of water.

EXAMPLES

Examples 1 to 8

Preparation of Emulsions Using a High Pressure Homogenizer

In a beaker were added water (40 g), emulsifier (in a total of 10 g) and, when indicated, a pour point depressor (5 g) under mechanical stirring. The mixtures were stirred until complete dissolution. This mixture is slowly poured into the etheramine under high mechanical stirring using an Ultra Turrax RW-20-IKA®, 2,000 rpm/min around 5 minutes at 25° C. (see a schematic representation of the Turrax used as FIG. 1).

Figure 2:
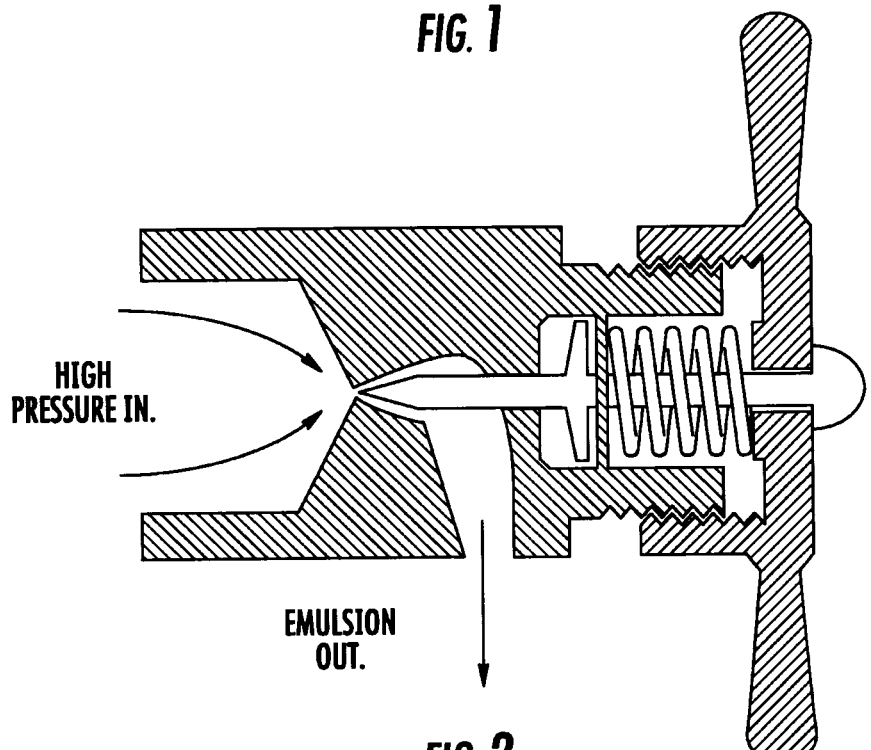
FIG. 2 is a schematic drawing of a high pressure homogenizer.

Afterwards, this pre-mixture is passed through a Laboratory Table Top Model Homogenizer under pressure up to 1,500 bar (see a scheme at FIG. 2) and at a temperature range from 30° C. to 45° C. This procedure was repeated for three times to reduce the particle size to desired nanoscale. FIG. 2 shows a schematic drawing of the high pressure homogenizer.

The general composition of examples prepared is reported in the Table 1.

TABLE 1

Formulations of examples 1 to 8.

| Raw Material | 1 | 2 to 8 |
|---|---|---|
| Ethermonoamine (g) | 60 | 50 |
| Emulsifiers (g) | 10 | 10 |
| Pour Point Depressor (g) | — | 5 |
| Water (g) | 30 | 35 |

The droplet size of the formulations obtained after homogenization is shown in table 2.

TABLE 2

Droplet size

| Product | Droplet Size (μm) |
|---|---|
| Example 1 | 3.2 |
| Example 2 | 5.3 |
| Example 3 | 1.1 |
| Example 4 | 0.7 |
| Example 5 | 1.0 |
| Example 6 | 2.6 |
| Example 7 | 0.2 |
| Example 8 | 0.03 |
| Comparison 1 | not measurable |
| Comparison 2 | 30.0 |
| Comparison 3 | 275.0 |

Reverse flotation of iron from ore with silica between 10% to 59%.

The flotation assays in lab scale had been executed with iron ore samples taken from a Brazilian mine. The itabiritic ore has a content of iron in the range of 59 to 63% and contains 6 to 8% of silica. The ore was milled until the granulometry has been adjusted for flotation to a particle size average of P80≅0.150 mm. The flotation test has been executed at pH of 10.5, starch was used as depressant in dosage of 720 g/ton and the dosage of collectors were 50 g/t. The results are shown in table 3.

TABLE 3

Results of iron ore flotation

| Product | Droplet Size (μm) | Mass Recovery (%) | % SiO₂ | % Fe | Fe Recovery (%) |
|---|---|---|---|---|---|
| Example 1 | 3.2 | 88.8 | 1.6 | 64.0 | 95.9 |
| Example 2 | 5.3 | 89.8 | 2.1 | 63.6 | 96.4 |
| Example 3 | 1.1 | 88.1 | 1.5 | 63.9 | 95.3 |
| Example 4 | 0.7 | 88.4 | 1.4 | 63.9 | 95.3 |
| Example 5 | 1.0 | 88.5 | 1.6 | 64.1 | 95.4 |
| Example 6 | 2.6 | 88.7 | 1.7 | 64.1 | 95.6 |
| Example 7 | 0.2 | 88.2 | 0.9 | 64.5 | 95.8 |
| Example 8 | 0.03 | 88.0 | 1.1 | 64.3 | 95.3 |
| Comparison 1 | — | 98.5 | 4.5 | 62.2 | 96.1 |
| Comparison 2 | 30.0 | 81.1 | 0.7 | 64.6 | 88.3 |
| Comparison 3 | 275 | 83.3 | 0.8 | 64.8 | 90.6 |

A mixture of an ether amine with an emulsifier (polyethoxyethylene cocoamine to 15 EO) as described in CA-1 100 239 was used for comparison with collectors of the state of the art (comparison 1). Additionally, a standard ether monoamine (comparison 2) and a partially neutralized ether monoamine (comparison 3) were tested for comparison purposes.

As showed in table 3 the collectors according to examples 1 to 8 provide a higher metallurgical recovery by at least 5 percent when compared with ether monoamines of the state of the art, not or partially neutralized. This higher metallurgical recovery offers a much, higher yield of valuable material at equal cost level of the applied collector for the mine.

Although the collector of comparison 1 also provides an iron recovery on excellent level its selectivity for silica is very low as expressed by the high content of remaining SiO₂. This low selectivity will be not accepted because mines generally specify their high quality grades of iron concentrate with a silica content of max. 1.8%.

Figure 3:
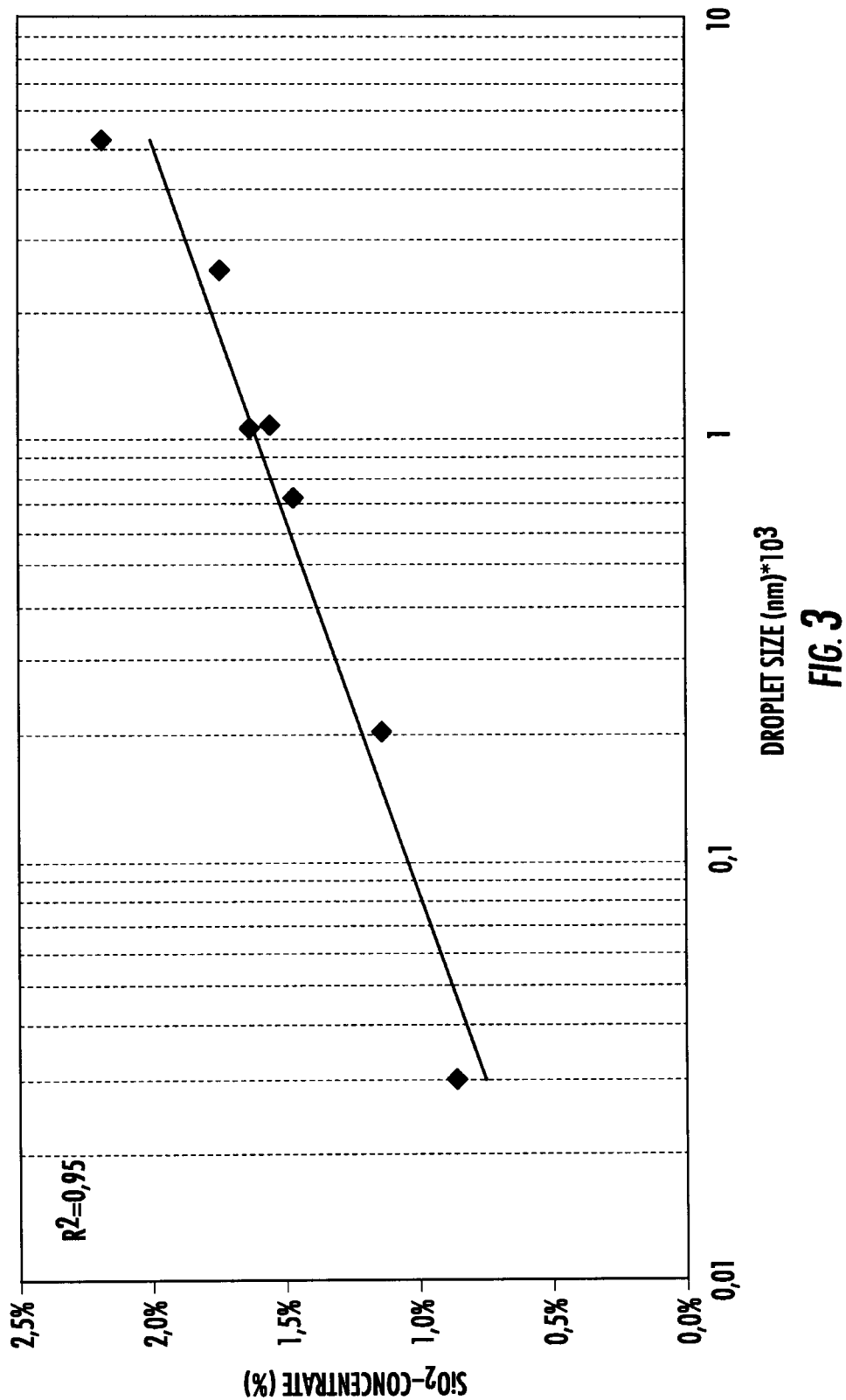
FIG. 3 is a graphical displaying the selectivity for silica in relation to droplet size.

Table 3 also clearly shows the direct relation of droplet size and selectivity. The droplet size of examples 1 to 8 varies from 30 nm to 5.3 μm. In this range the observed metallurgical performance of the collectors is not only better than those of ether monoamine collectors with a droplet size above 30 μm but also a correlation of decreasing SiO₂ content with decreasing droplet size as observed, as shown in FIG. 3.

Another important aspect observed during the assays was the effective dosage rate under consideration of real active matter. The inventive products described by examples 1 to 8 contain between 50% and 60% of active collector whereas the standard collectors of state of the art contain 100% active collector. Therefore, the inventive products provide a tremendous advantage in comparison with collectors of state of the art. They are two times more efficient in conjunction with improved metallurgical performance in respect of iron recovery and selectivity for silica.

The invention claimed is:

1. A nanoemulsion, comprising at least one collector for the flotation of silicate minerals from other minerals, at least one emulsifier, and water, wherein water forms the continuous phase, the average particle size of the collector is from 1 nm to 6 μm, and wherein the collector is a compound comprising at least one nitrogen atom and at least one hydrocarbon group having 6 to 30 carbon atoms; and wherein the collector is present in an amount of 20 to 60 wt.-%, based on the total weight of the nanoemulsion.

2. The nanoemulsion as claimed in claim 1 wherein the collector is selected from the group consisting of ethermonoamines, etherdiamines, sternamines, hydrocarbon amines, ammonium compounds, and mixtures thereof.

3. The nanoemulsion as claimed in claim 1, wherein the emulsifier is present in an amount of 0.1 to 20 wt.-%, based on the total weight of the nanoemulsion.

4. The nanoemulsion as claimed in claim 1, wherein water is present in an amount of 20 to 79.9 wt.-%, based on the total weight of the nanoemulsion.

5. The nanoemulsion as claimed in claim 1, wherein the particle size of the collector forming the discontinuous phase is from 3 nm to 6 μm.

6. The nanoemulsion as claimed in claim 1, wherein the emulsifier is an alkoxylated fatty alcohol of formula 11a or 11b

wherein n and m are independently from each other 1 to 30, A and B are independently from each other $C_2$- to $C_4$-alkylene groups and R is a saturated or unsaturated, branched or linear $C_6$ to $C_{30}$ aliphatic or aromatic hydrocarbon group.

7. The nanoemulsion as claimed in claim 1, wherein the emulsifier is an alkoxylated fatty alcohol of formula 11a or 11b

wherein n and m are independently from each other from 2 to 10, A and B are independently from each other $C_2$- to $C_4$-alkylene groups and R is a $C_6$ to $C_{20}$ alkyl, alkylaryl or alkenyl group.

* * * * *